(12) United States Patent
Takata et al.

(10) Patent No.: US 8,654,514 B2
(45) Date of Patent: Feb. 18, 2014

(54) TRAPPED-KEY-BASED LOCKING SYSTEM FOR DOCKING STATION

(71) Applicant: Trystar, Inc., Faribault, MN (US)

(72) Inventors: Steven M. Takata, Minneapolis, MN (US); James J. Koberg, Morristown, MN (US); Brian A. Amacher, Faribault, MN (US); Nicholas Goebel, Faribault, MN (US)

(73) Assignee: Trystar, Inc., Faribault, MN (US)

( * ) Notice: Subject to any disclaimer, the term of this patent is extended or adjusted under 35 U.S.C. 154(b) by 0 days.

(21) Appl. No.: 13/759,561

(22) Filed: Feb. 5, 2013

(65) Prior Publication Data

US 2013/0148269 A1    Jun. 13, 2013

Related U.S. Application Data

(63) Continuation of application No. 12/967,640, filed on Dec. 14, 2010, now Pat. No. 8,395,883.

(51) Int. Cl.
*H02B 1/26* (2006.01)
*H05K 1/14* (2006.01)

(52) U.S. Cl.
USPC ........ 361/641; 361/740; 361/741; 312/223.1; 312/223.2

(58) Field of Classification Search
None
See application file for complete search history.

(56) References Cited

U.S. PATENT DOCUMENTS

| | | |
|---|---|---|
| 3,631,324 A | 12/1971 | Jones |
| 5,581,133 A | 12/1996 | Smith et al. |
| 5,819,567 A | 10/1998 | Eden et al. |
| 6,096,986 A | 8/2000 | Flegel et al. |
| 6,184,595 B1 | 2/2001 | Flegel, Jr. |
| 6,424,060 B1 | 7/2002 | Shiely et al. |
| 6,521,849 B1 | 2/2003 | Flegel |
| 6,621,689 B1 | 9/2003 | Flegel |
| 6,995,327 B1 | 2/2006 | Shepstone et al. |
| 7,030,514 B2 | 4/2006 | Wareham et al. |
| 7,136,278 B2 | 11/2006 | Allen |
| 7,250,875 B2 | 7/2007 | Schnackenberg |
| 7,418,314 B2 | 8/2008 | Rasmussen et al. |
| 7,462,792 B1 | 12/2008 | Hellmers et al. |
| 7,471,505 B2 | 12/2008 | Gull et al. |
| 7,602,083 B1 | 10/2009 | Flegel et al. |
| 7,616,432 B2 | 11/2009 | Luebke et al. |
| 8,395,883 B2 * | 3/2013 | Takata et al. .................. 361/641 |

OTHER PUBLICATIONS

"The safe way to transfer power, Quick-connect double-throw safety switch" pamphlet, Nov. 2010, Publication No. BR00801004E / Z10433, pp. 1-7, Eaton Corporation, Cleveland, Ohio.
"Generator Connection Cabinets" web page, as accessed online at http://www.bertholdelectric.com/gusBerthold/portableGeneratorConnectionCabinets.asp on Apr. 28, 2011, Berthold Electric Company, Elgin, Illinois 2006.

* cited by examiner

*Primary Examiner* — Jayprakash N Gandhi
*Assistant Examiner* — Dion Ferguson
(74) *Attorney, Agent, or Firm* — Fredrikson & Byron, P.A.

(57) ABSTRACT

Embodiments of the present invention provide a docking station that prevents electrical cables (e.g., from a portable power generator or other temporary power source) from even being connected to connectors in the interior of the docking station while the building's electrical system (or other electrical load) is in electrical communication with the utility. The docking station can include a cabinet with two doors that swing in different directions and a locking mechanism that regulates the opening and closing of those doors. In preferred embodiments, the locking mechanism includes a trapped-key lock. Embodiments of the present invention can be used in applications other than docking stations.

20 Claims, 8 Drawing Sheets

TRAPPED-KEY-BASED LOCKING SYSTEM FOR DOCKING STATION

RELATED APPLICATION

This application is a continuation of U.S. patent application Ser. No. 12/967,640, filed Dec. 14, 2010, the entire contents of which are incorporated herein by reference.

TECHNICAL FIELD

This disclosure relates to docking stations for connecting a temporary power source to an electrical load.

BACKGROUND

Connecting a temporary power source to an electrical load can often be relatively complex, not to mention dangerous. One such scenario that occurs commonly is when a portable generator is connected to a building's electrical system. Traditionally, this would be a job for a trained electrician. But when an event occurs that causes longer-term power outages (e.g., a natural disaster), electricians are often in such high demand that days can pass before one becomes available. While a company is waiting for an electrician, its building is without power, even though the company has secured a portable generator.

In some embodiments, the temporary power source is the utility power supply, which can be temporary in the sense that it supplies power to a structure for only a limited amount of time. For example, a school's annual festival can involve a temporary structure that functions as an electrical load. The school building can have a docking station that easily permits the temporary structure to access the utility power source through the school building. Additionally, in some instances, docking stations can facilitate servicing/maintaining portable generators. Docking stations can also be used in pneumatic and hydraulic situations.

Docking stations can be helpful in this regard. For connecting a portable generator to a building's electrical system, a docking station can be wired into the electrical system, which can present a significantly less complex interface for connecting a portable generator. For buildings with docking stations, the person who delivers the portable generator (who is almost never a trained electrician) is typically trained to connect the portable generator to the docking station. In this way, a company can begin using its portable generator much sooner.

One of the most important considerations in connecting a portable generator to a building's electrical system is to avoid a scenario in which the electrical system is in electrical communication with both the portable generator and the utility at the same time. In such a scenario, if the generator were supplying power to the electrical system and the utility were not, the power supplied by the generator would also be transmitted over the utility lines. This would pose grave danger to a utility worker working on the lines and supposing them to be without power. If, on the other hand, the utility were to resume supplying power to the electrical system while the electrical system was still in electrical communication with the generator, the generator would be subject to serious adverse consequences. Accordingly, it is important that the switch between the generator and the electrical system and the switch between the electrical system and the utility not be closed at the same time.

While most docking stations take no precaution against a building's electrical system being in electrical communication with both the utility and the portable generator at the same time, attempts at such a precaution have been made. Two examples are products offered by Eaton Corporation called the "Generator Quick Connect" and the "Quick Connect Safety Switch." However, there are significant drawbacks associated with these products.

SUMMARY

Embodiments of the present invention provide a docking station that prevents electrical cables (e.g., from a portable power generator or other temporary power source) from even being connected to connectors in the interior of the docking station while the building's electrical system (or other electrical load) is in electrical communication with the utility. The docking station can include a cabinet with two doors that swing in different directions and a locking mechanism that regulates the opening and closing of those doors. In preferred embodiments, the locking mechanism includes a trapped-key lock. In some such embodiments, the locking mechanism prevents both doors from opening when the building's electrical system is in electrical communication with the utility. In some such embodiments, the locking member prevents moving the building's electrical system into electrical communication with the utility when either of the two doors is open. Similar precautions can be implemented for switching from the portable generator back to the utility. For example, when the interior of the docking station is accessible (e.g., when even one door is opened), the building's electrical system can be prevented from being put into electrical communication with the utility.

By preventing an operator from connecting cables to the cabinet's interior unless the utility power supply is disconnected, embodiments of the present invention provide various advantages over systems that allow connecting the cables but do not allow the generator switch to be closed. For example, preferred embodiments of the present invention do not require a secondary switch, which can result in significant cost savings. Additionally, in preferred embodiments of the present invention, an operator can clearly see whether cables are connected to the cabinet interior or not and thus can easily determine whether or not the building's electrical system is electrically connected to the utility power supply.

Embodiments of the present invention can be used in applications other than docking stations. For example, an embodiment of the present invention can involve a cabinet with two doors and a trapped-key-based locking mechanism. The two doors can swing independently of one another in different directions. The locking mechanism's key can be trapped when either door is open and untrapped when both doors are closed. Example cabinets in which aspects of the present invention can be implemented include cabinets having doors that must be sequentially locked and/or unlocked.

Other aspects, features, and advantages will be apparent from the following detailed description, including the drawings and the claims.

BRIEF DESCRIPTION OF FIGURES

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF ILLUSTRATIVE EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Figure 1:
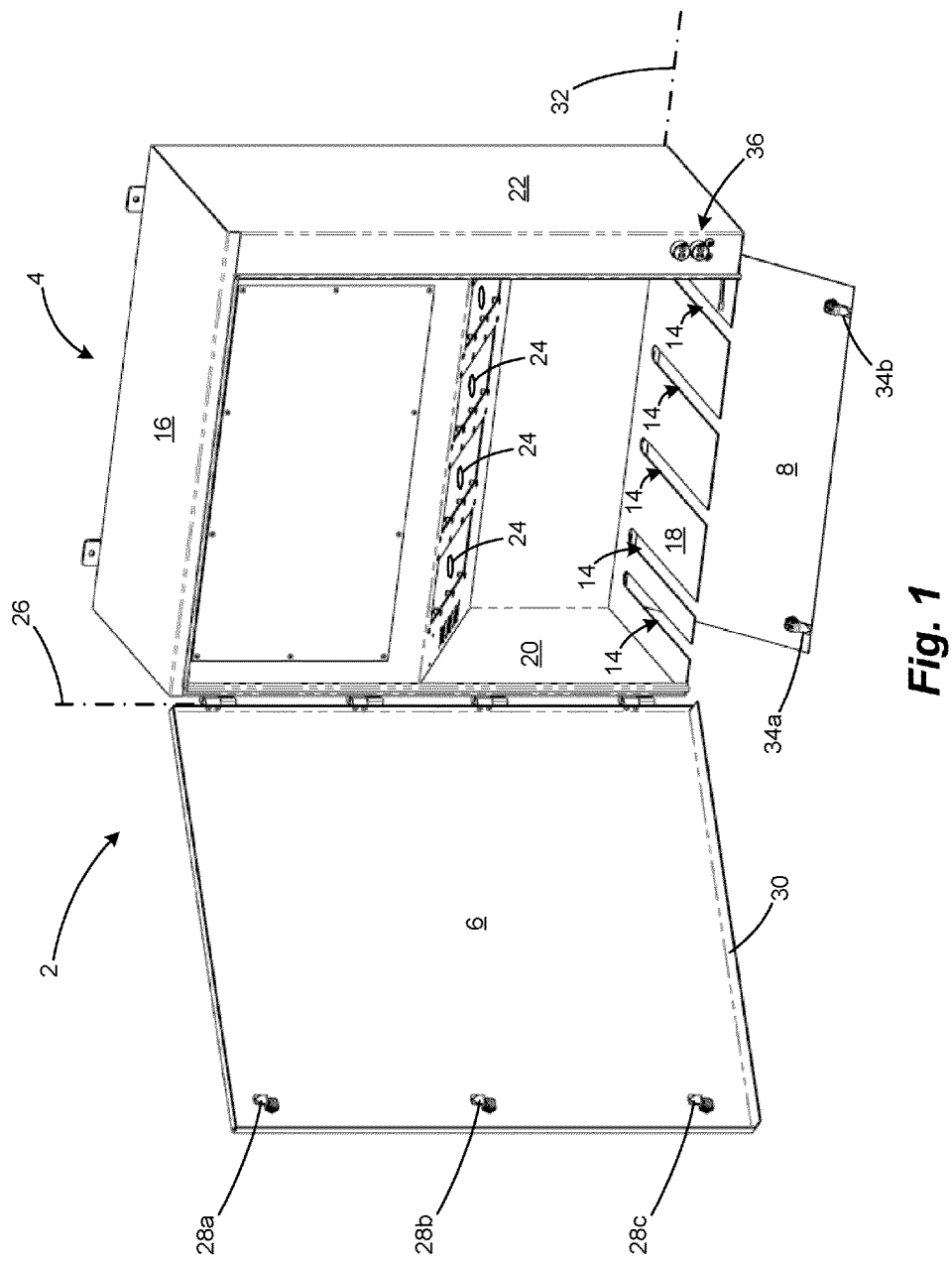
FIG. 1 is a perspective view of an illustrative docking station cabinet in accordance with embodiments of the present invention.

FIG. 1 shows a docking station cabinet 2 in accordance with embodiments of the present invention. The docking station cabinet 2 can aid in connecting a temporary power source to an electrical load. For example, the docking station cabinet 2 can be hard-wired into a building's electrical system and can present a straightforward interface for a portable power generator to connect to the electrical system. As shown, the docking station cabinet 2 includes a compartment 4, along with a main door 6 and a cable-slot door 8. The compartment 4 can include one or more cable slots 14 in one of its surfaces (in the bottom surface 18 as shown). In preferred embodiments, each cable slot 14 can be sized to prevent an electrical-cable connector that is attached to an electrical cable and in the interior of the compartment 4 from withdrawing from the interior of the compartment 4 through the cable slot 14. The cable slots 14 can be wide enough to allow cables to pass through but narrow enough so that the cable's connectors cannot pass through.

The compartment 4 can have a variety of configurations, depending on the particular configuration. In most embodiments, the compartment 4 includes a top surface 16, a bottom surface 18, and opposed side surfaces 20, 22. However, other configurations (e.g., one or more curved surfaces; multiple top, bottom, or side surfaces; etc.) are both contemplated and possible. In most such embodiments, the bottom surface 18 has the cable slots 14. However, the cable slots 14 can be defined in any suitable surface of the compartment 4, such as the top surface 16 or either of the side surfaces 20, 22.

One or more cabinet-electrical-connectors 24 can be housed in the interior of the compartment 4. The cabinet-electrical-connectors 24 can facilitate easy connection for generator cables (or cables of another temporary power source). This simple connection can enable electrical connection between the temporary power source and the electrical load (e.g., a building's electrical system). In some embodiments, the cabinet-electrical-connectors 24 can have structural features configured to mate with corresponding structural features of the cable connectors to facilitate proper alignment. In some such embodiments, the complementary structural features can ensure connection in their proper sequence.

The main door 6 can be hingedly connected to the compartment 4 and thus may be rotatable about a main-door axis 26 (which is typically a generally vertical axis) relative to the compartment 4. As shown, the main-door axis 26 is on the left side on the front of the compartment 4. In preferred embodiments, the main door 6 can cover the front of the compartment 4 when in the main-door-closed position. However, in some embodiments, the main door 6 can cover a different part of the compartment 4 (e.g., a side of the compartment 4) or a portion of any part of the compartment 4. The main door 6 can be rotated between a main-door-closed position and a main-door-open position. In FIG. 1, the main door 6 is in the main-door-open position. The cabinet-electrical-connector 24 can be accessible when the main door 6 is in the main-door-open position.

The cable-slot door 8 can be hingedly connected to the compartment 4 and thus may be rotatable about a cable-slot-door axis 32 (which is typically a generally horizontal axis) relative to the compartment 4. The location of the cable-slot door 8 can be dictated by the location of the compartment's cable slots 14. When, as is most common, the cable slots 14 are in the bottom surface 18 of the compartment 4, the cable-slot door 8 can be positioned to cover all or part of the bottom surface 18. As shown, the cable-slot-door axis 32 is on the rear side on the bottom of the compartment 4. The cable-slot door 8 can be rotated between a cable-slot-door-closed position and a cable-slot-door-open position. When the cable-slot door 8 is in the cable-slot-door-open position, an electrical cable can be extended from the exterior of the compartment 4 through the compartment's cable slots 14 into the interior of the compartment 4. This is most commonly done when both the main door 6 and the cable-slot door 8 are open and the cable connector is brought into the interior of the compartment 4 through the main door 6. When the cable-slot door 8 is in the cable-slot-door-closed position, the cable-slot door 8 can cover the compartment's cable slots 14. In this way, the electrical cable can be prevented from extending from the exterior of the compartment 4 through the compartment's cable slots 14 into the interior of the compartment 4. When both the main door 6 and the cable-slot door 8 are closed, the interior of the compartment 4 can be inaccessible.

In preferred embodiments, latching mechanisms can regulate opening and closing of the main door 6 and the cable-slot door 8. The main door 6 can include one or more main-door latches 28a, 28b, 28c, and the cable-slot door 8 can include one or more cable-slot-door latches 34a, 34b. As is discussed in greater detail below, main-door latch 28c and cable-slot-door latch 34b can be positioned near one another when the main door 6 and the cable-slot door 8 are both closed and can play a role in locking and unlocking the main door 6 and the cable-slot door 8.

In preferred embodiments, the main door 6 can include a flange 30. The flange 30 can extend (e.g., continuously, intermittently, for only a small extent, etc.) along the surface of the compartment 4 that has the cable slot 14, on the exterior of the compartment 4, when the main door 6 is in the main-door-closed position. As shown, the main door's flange 30 extends along the bottom surface 18 of the compartment 4 on the exterior of the compartment 4 when the main door 6 is in the main-door-closed position. In many embodiments, the main door's flange 30 can prevent the cable-slot door 8 from rotating from the cable-slot-door-closed position to the cable-slot-door-open position, or from the cable-slot-door-open position to the cable-slot-door-closed position, when the main door 6 is in the main-door-closed position. In such configurations, for the cable-slot door 8 to freely open or close, the main door 6 must be in the main-door-open position.

In preferred embodiments, the docking station cabinet 2 includes a compartment locking mechanism 36. As alluded to, the compartment locking mechanism 36 can interact with main-door latch 28*c* and cable-slot-door latch 34*b* to lock and unlock the main door 6 and the cable-slot door 8. Main-door latch 28*c* and cable-slot-door latch 34*b* can be located in close proximity to the compartment locking mechanism 36 when the main door 6 is in the main-door-closed position and the cable-slot door 8 is in the cable-slot-door-closed position. For docking stations that permit easy connection between a portable power generator and a building's electrical system, the compartment locking mechanism 36 can permit access to the interior of the compartment 4 only when the electrical system is disconnected from the utility power source. In many such docking stations, the compartment locking mechanism 36 can permit re-connection of the building's electrical system only when the interior of the compartment 4 has been made inaccessible.

FIGS. 2-8 depict the illustrative compartment locking mechanism 36 in greater detail. As shown, the compartment locking mechanism 36 includes a locking-mechanism housing 38 coupled to the interior of the compartment 4. The a locking-mechanism housing 38 can define a bore 40. In preferred embodiments, the bore 40 is generally cylindrical. In some embodiments, the bore 40 can have other configurations (e.g., the cross-sectional profile can be a square or other polygon or other shape).

Figure 2:
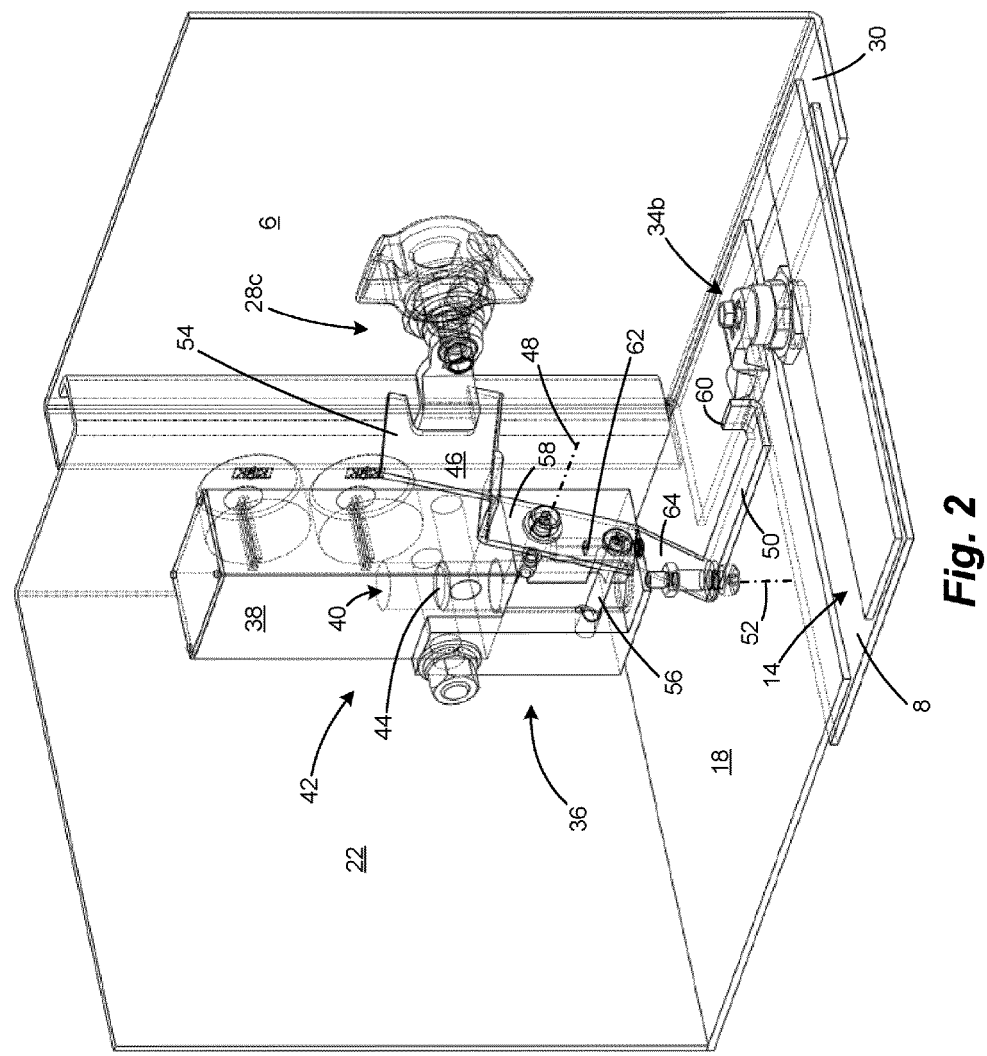
FIG. 2 is a perspective view of the locking mechanism included in the docking station of FIG. 1.

In preferred embodiments, the compartment locking mechanism 36 can include a trapped-key lock 42 coupled to the compartment 4. One kind of trapped-key lock 42 is offered by Kirk Key Interlock of Massilon, Ohio. The trapped-key lock 42 can include a key. As is discussed in greater detail elsewhere herein, the key can be the same key that is used in a separate trapped-key lock (e.g., one that controls opening/closing of the main breaker switch). The trapped-key lock 42 can include a plunger 44, which can have a cross-sectional profile that generally matches that of the bore 40. The key can turn to translate the plunger 44 within the bore 40. The plunger 44 can translate between a trapped position and an untrapped position. FIG. 2 shows the plunger 44 in the untrapped position. In this position, the key can be freely inserted into, and removed from, the trapped-key lock, but neither the main door 6 nor the cable-slot door 8 can be opened. Thus, the interior of the compartment 4 cannot be accessed when the plunger is in the untrapped position.

Figure 3:
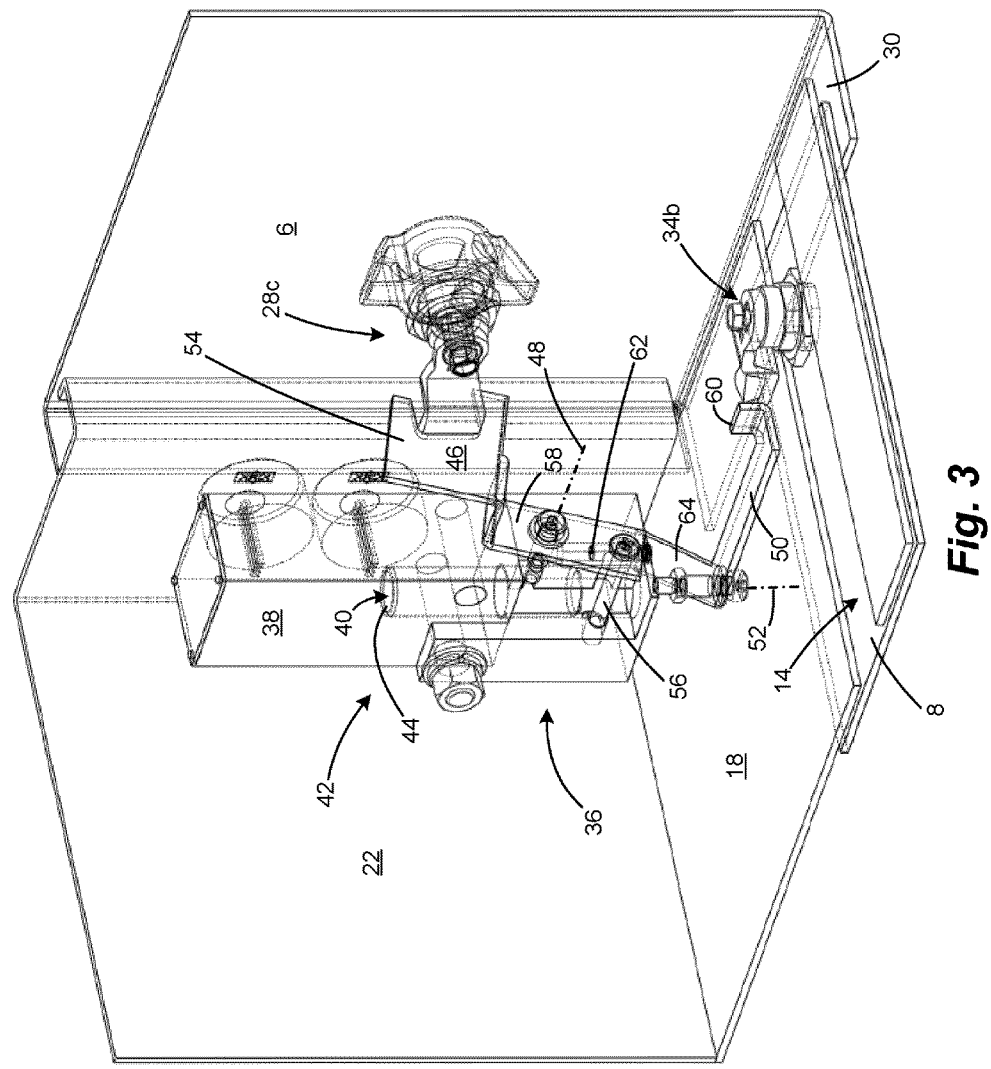
FIG. 3 is a perspective view of the locking mechanism included in the docking station of FIG. 1.

FIG. 3 shows the compartment locking mechanism 36 in the same position as in FIG. 2, except the plunger 44 has been translated from the untrapped position to the trapped position. To accomplish this translation of the plunger 44, the key can have been inserted into the trapped-key lock 42 and turned appropriately. When the plunger 44 is in the trapped position, the key is trapped.

Referring again to FIGS. 2-8, the compartment locking mechanism 36 can include a main-door-locking member 46 coupled to the locking-mechanism housing 38, which can serve to regulate locking/unlocking of the main door 6. The main-door-locking member 46 can be movable between a main-door-locked position (e.g., FIGS. 2-3) and a main-door-unlocked position (e.g., FIGS. 4-8). In preferred embodiments, the main-door-locking member 46 can be rotatable about a main-door-locking member axis 48 between the main-door-locked position and the main-door-unlocked position.

Figure 4:
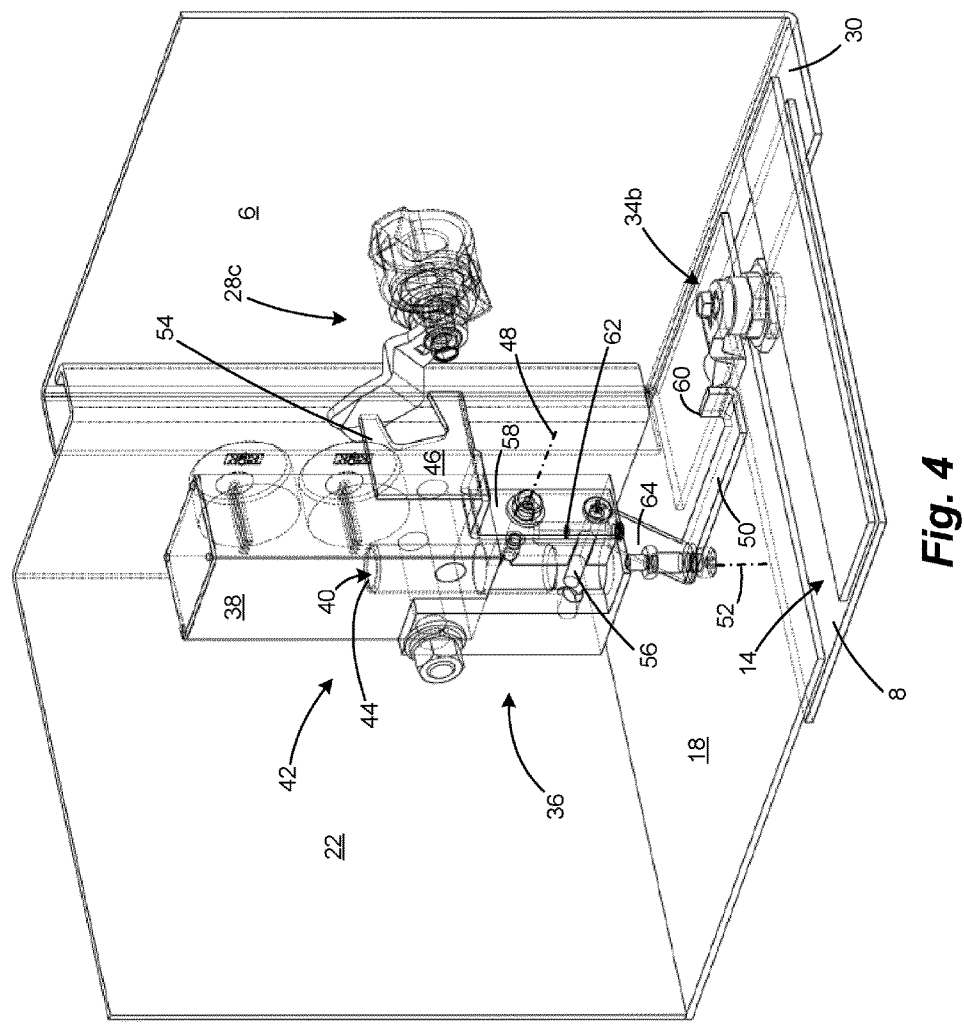
FIG. 4 is a perspective view of the locking mechanism included in the docking station of FIG. 1.

FIGS. 2-4 illustrate the movement/rotation of the main-door-locking member 46. In the main-door-locked position, the main-door-locking member 46 can be prevented from moving into the bore 40 by the plunger 44 in the untrapped position, and the main door 6 can be prevented from opening. The main-door-locking member 46 can have a first portion 54 and a second portion 56 joined by a third portion 58. In FIG. 2, the first portion 54 is engaging main-door latch 28*c* and preventing main-door latch 28*c* from unlatching. In FIG. 4, the main-door-locking member 46 has rotated about the main-door-locking member axis 48 such that the first portion 54 is no longer preventing main-door latch 28*c* from unlatching. In FIG. 2, the plunger 44 blocks the second portion 56 from entering the bore 40, which means that the main-door-locking member is unable to rotate and the first portion 54 prevents the main-door latch 28*c* from unlatching.

Figure 5:
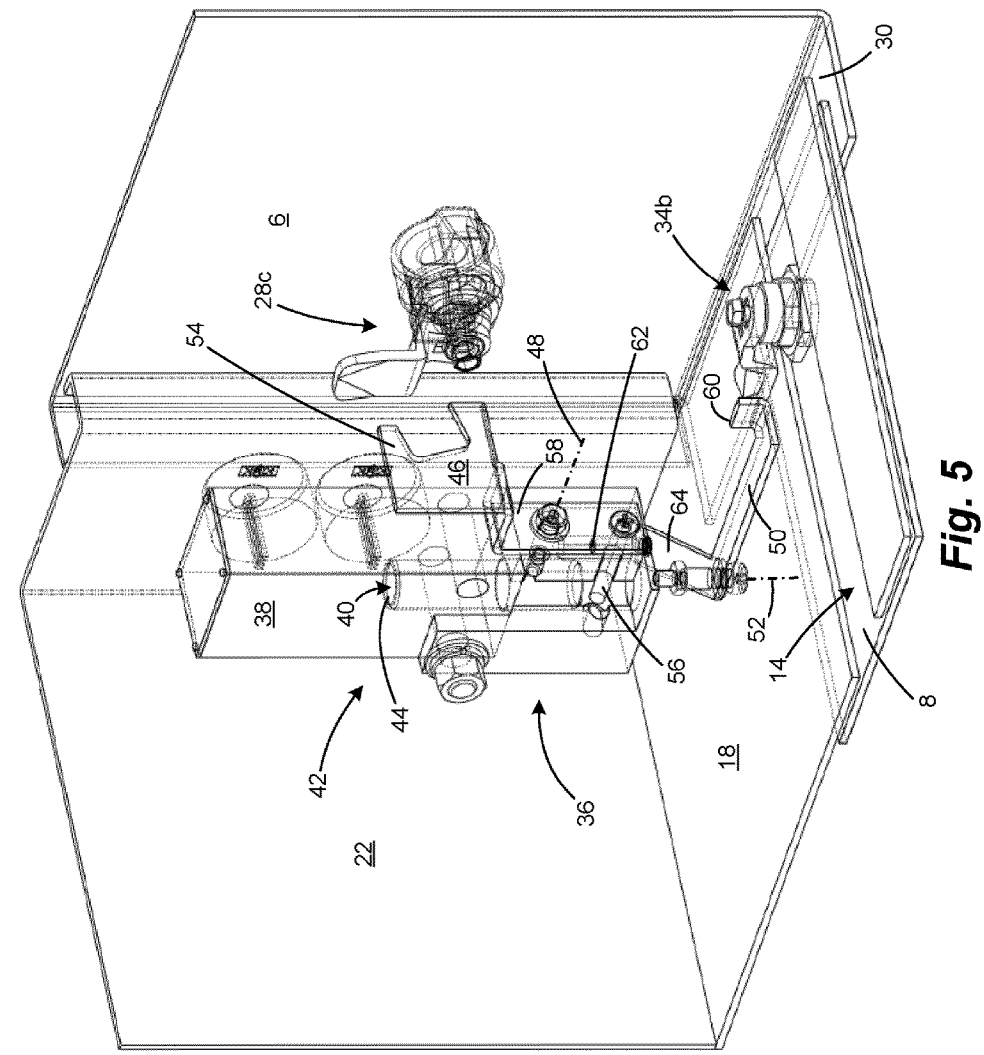
FIG. 5 is a perspective view of the locking mechanism included in the docking station of FIG. 1.

In the main-door-unlocked position (e.g., FIGS. 3-4), the main-door-locking member 46 can be moved into (e.g., rotated to enter) the bore 40 unimpeded by the plunger 44 in the trapped position and the main door 6 can be permitted to open. In FIG. 4, main-door latch 28*c* is being turned, which can press against the first portion 54 and cause the main-door-locking member 46 to rotate about the main-door-locking member axis 48. This rotation can cause the second portion 56 to enter the bore 40, which is no longer impeded by the plunger 44 because the plunger 44 has translated out of the way (into the trapped position). In this way, in the main-door-unlocked position, the main-door-locking member 46 can be moved into the bore 40 unimpeded by the plunger 44 in the trapped position as a result of the main-door latch 28*c* being unlatched. FIG. 5 shows main-door latch 28*c* unlatched, and the main door 6 is opened in FIG. 6.

Referring now to FIGS. 4-8, when the main-door-locking member 46 is in the main-door-unlocked position, the plunger 44 can be prevented from translating to the untrapped position. The second portion 56 of the main-door-locking member 46 can be in the bore 40 when the main-door-locking member 46 is in the main-door-unlocked position. In this way, the second portion 56 can block translation of the plunger 44 to the untrapped position. In this illustrative configuration, the plunger 44 cannot be returned to the untrapped position, thus untrapping the key, until at least the main-door-locking member 46 has been returned to the main-door-locked position. This can occur when main-door latch 28*c* re-engages the first portion 54, causing the second portion 56 to rotate out of the bore 40.

Referring again to FIGS. 2-8, the compartment locking mechanism 36 can include a cable-slot-door-locking member 50 coupled to the locking-mechanism housing 38, which can serve to indicate when the cable-slot door 8 is opened or closed. The cable-slot-door-locking member 50 can be movable between a cable-slot-door-locked position (e.g., FIGS. 2-6) and a cable-slot-door-unlocked position (e.g., FIGS. 7-8). In preferred embodiments, the cable-slot-door-locking member 50 can be rotatable about a cable-slot-door-locking member axis 52 between the cable-slot-door-locked position and the cable-slot-door-unlocked position.

Figure 6:
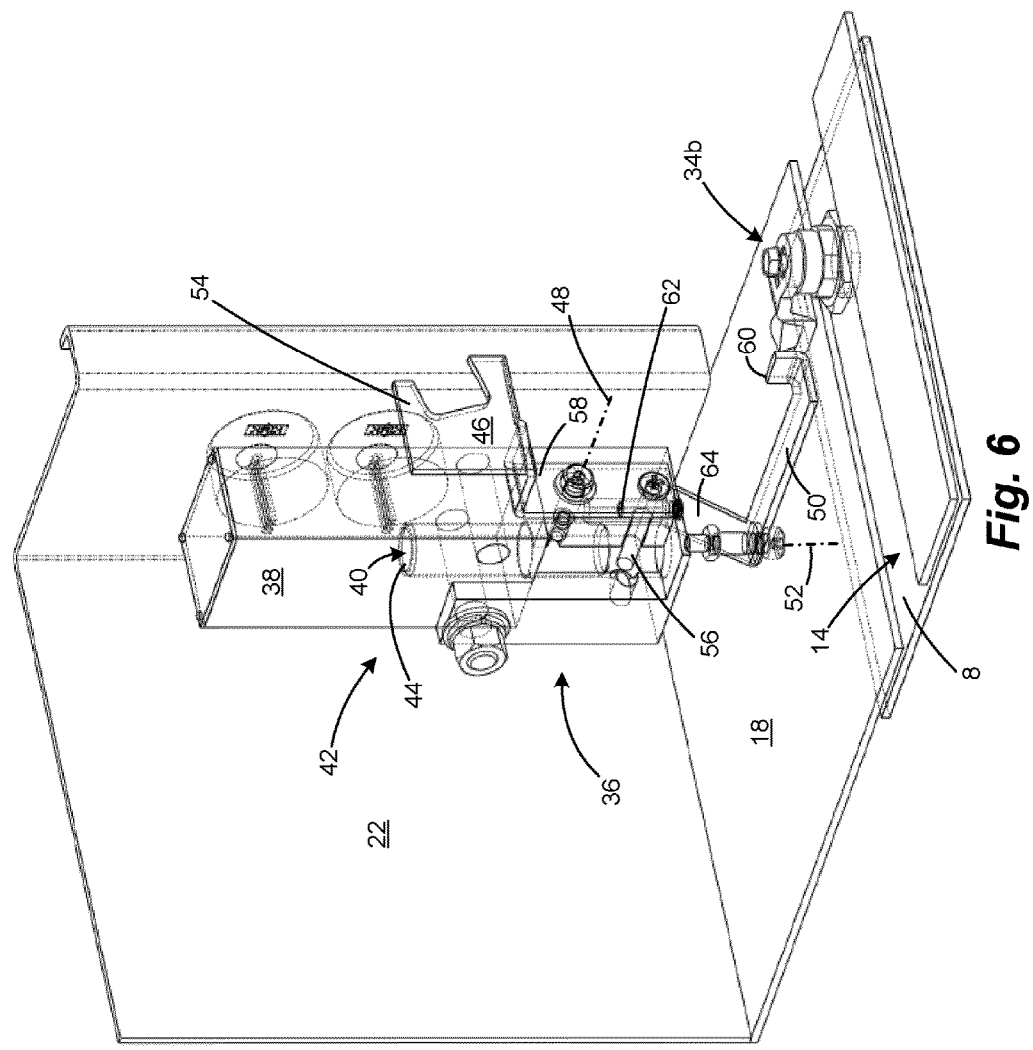
FIG. 6 is a perspective view of the locking mechanism included in the docking station of FIG. 1.
Figure 7:
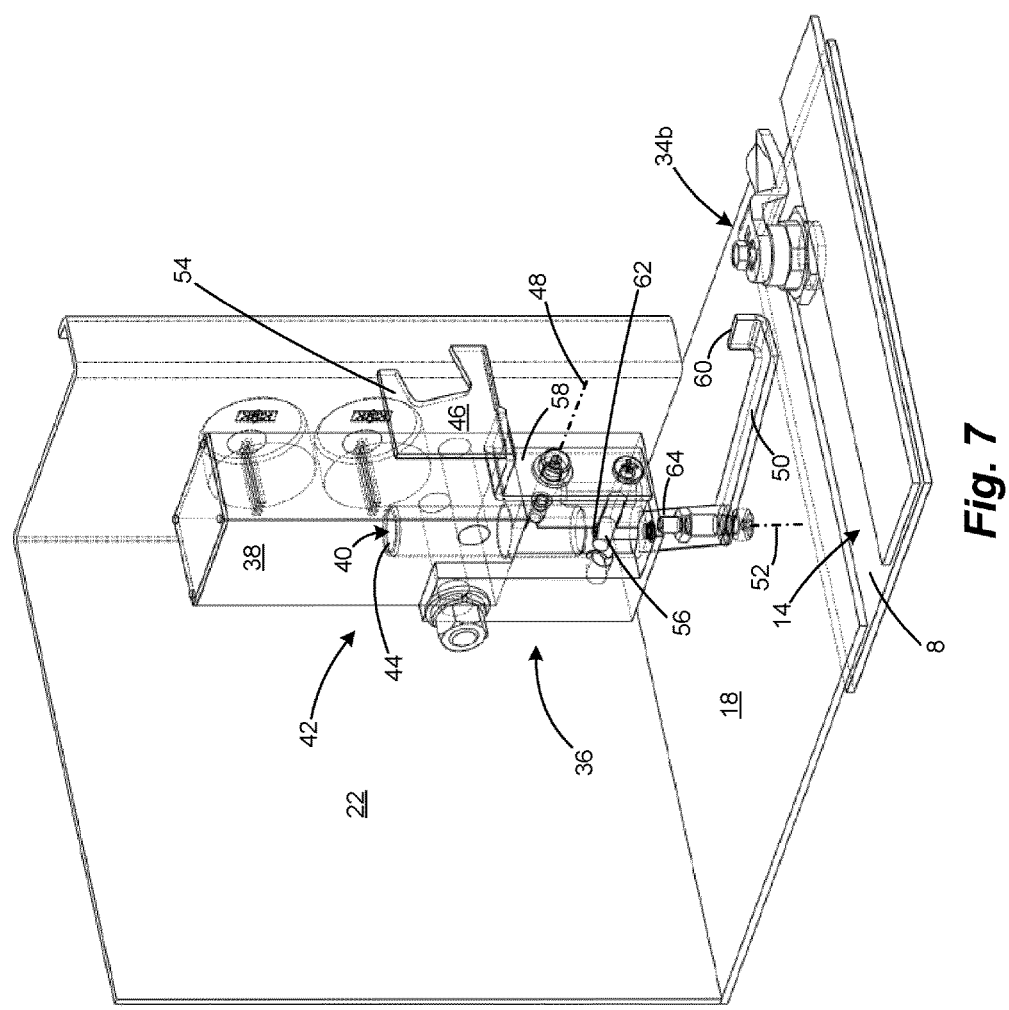
FIG. 7 is a perspective view of the locking mechanism included in the docking station of FIG. 1.

FIGS. 2, 6, and 7 illustrate the movement/rotation of the cable-slot-door-locking member 50. In the cable-slot-door-locked position, the cable-slot-door-locking member 50 can be prevented from moving into the bore 40 by the plunger 44 in the untrapped position. The cable-slot door 8 can be prevented from opening by the flange 30 of the main door. Cable-slot-door latch 34*b* can be turned in one direction without interference from the cable-slot-door-locking member 50, but the cable-slot door 8 of this configuration is still not able to open until the main door 6 is first opened and the flange 30 is brought out of contact with the cable-slot door 8. When the main door 6 is removed, cable-slot-door latch 34b can be appropriately turned to unlatch cable-slot-door latch 34b, and the cable-slot door 8 can be moved to the cable-slot-door-open position.

Figure 8:
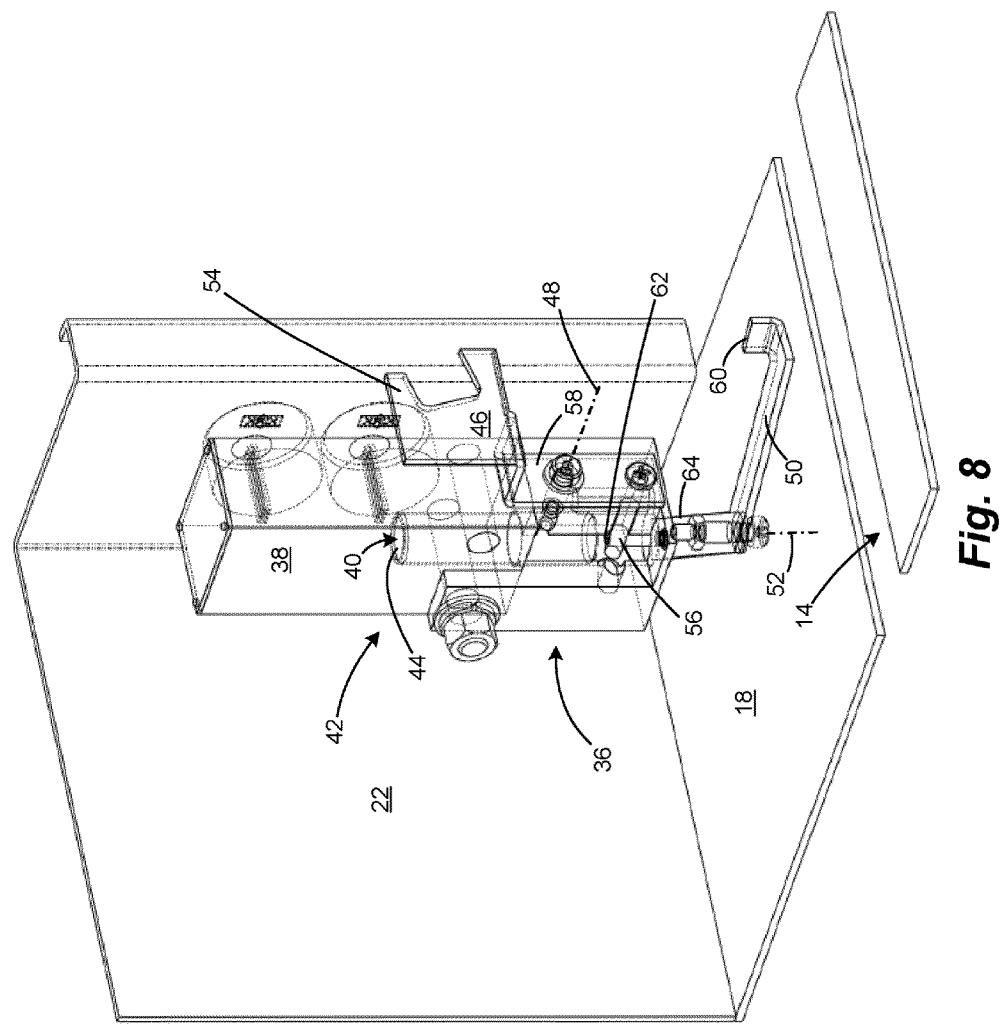
FIG. 8 is a perspective view of the locking mechanism included in the docking station of FIG. 1.

In the cable-slot-door-unlocked position (e.g., FIGS. 7-8), the cable-slot-door-locking member 50 can be moved into (e.g., rotated to enter) the bore 40 unimpeded by the plunger 44 in the trapped position and the cable-slot door 8 can be permitted to open. As shown, the cable-slot-door-locking member 50 can include a first portion 60 and a second portion 62 connected by a third portion 64. A rotational force can bias the cable-slot-door-locking member 50 in direction C. Referring to FIG. 2, when the plunger 44 is in the untrapped position, the plunger 44 can engage the second portion 62 of the cable-slot-door-locking member 50 and oppose the rotational biasing force. Referring to FIG. 6, when the plunger 44 has been translated to the trapped position, and the main door 6 has been opened, the rotational biasing force can be opposed by cable-slot-door latch 34b. In FIG. 7, cable-slot-door latch 34b can be rotated/unlatched, thereby removing opposition to the rotational biasing force. This can cause the cable-slot-door-locking member 50 to rotate about the cable-slot-door-locking member 50 to rotate about the cable-slot-door-locking member axis 52 such that the second portion 62 enters the bore 40. In this way, in the cable-slot-door-unlocked position, the cable-slot-door-locking member 50 can be moved into the bore 40 unimpeded by the plunger 44 in the trapped position as a result of a rotational biasing force that is unopposed by the cable-slot-door latch 34b when unlatched. In FIG. 8, the cable-slot door 8 is opened.

Referring now to FIGS. 7-8, when the cable-slot-door-locking member 50 is in the cable-slot-door-unlocked position, the plunger 44 can be prevented from translating to the untrapped position. The second portion 62 of the cable-slot-door-locking member 50 can be in the bore 40 when the cable-slot-door-locking member 50 is in the cable-slot-door-unlocked position. In this way, the second portion 62 can block translation of the plunger 44 to the untrapped position. In this illustrative configuration, the plunger 44 cannot be returned to the untrapped position, thus untrapping the key, until at least the cable-slot-door-locking member 50 has been returned to the cable-slot-door-locked position. This can occur when cable-slot-door latch 34b re-engages the first portion 60, thereby once again opposing the rotational biasing force and causing the second portion 62 to rotate out of the bore 40.

It should be emphasized that compartment locking mechanism configurations other than the one illustrated in FIGS. 2-8 can be implemented in accordance with embodiments of the present invention. In some embodiments, the cable-slot door can have a flange that prevents the main door from opening before the cable-slot door. In some such embodiments, the compartment locking mechanism can be essentially reversed from the configuration of FIGS. 2-8, with the main-door-locking member having the attributes of cable-slot-door-locking member 50 and the cable-slot-door-locking member having the attributes of main-door-locking member 46. Other configurations are possible in which the respective locking members are blocked out of the bore when the doors are closed but in the bore when the doors are open.

Embodiments of the present invention include methods of connecting a temporary power source to an electrical load. Such methods typically involve providing a docking station cabinet like those discussed elsewhere herein. For example, the docking station cabinet can include a compartment, a cabinet-electrical-connector, a main door, a cable-slot door, and a compartment locking mechanism. Each of these components can have attributes as discussed elsewhere herein. In preferred embodiments, when the cable-slot door is closed, the cable-slot door covers the compartment's cable slot, thereby preventing the electrical cable from extending through the compartment's cable slot.

The method can involve inserting a key into the trapped-key lock and turning the key. Turning the key can translate a plunger within a bore from an untrapped position to a trapped position. In the untrapped position, the plunger can prevent both a main-door-locking member and a cable-slot-door-locking member from entering the bore. The key is trapped when the plunger is in the trapped position.

The method can involve unlocking the main door and the cable-slot door. The main-door-locking member and the cable-slot-door-locking member can both be moved into the bore unimpeded by the plunger in the trapped position. In some embodiments, moving the main-door-locking member into the bore can include rotating the main-door-locking member about a main-door-locking member axis. In some embodiments, moving the cable-slot-door-locking member into the bore can include rotating the cable-slot-door-locking member about a cable-slot-door-locking member axis. In some embodiments, moving the main-door-locking member into the bore comprises unlatching a main-door latch of the main door. In some embodiments, moving the cable-slot-door-locking member into the bore comprises a rotational biasing force acting on the cable-slot-door-locking member that is unopposed by a cable-slot-door latch of the cable-slot door when unlatched. This can unlock the main door and the cable-slot door and permit them to be opened.

The method can include opening both the main door and the cable-slot door to access the cabinet-electrical-connector. When either the main door or the cable-slot door is open, the plunger can be prevented from translating to the untrapped position. In preferred embodiments, the docking station cabinet's main door includes a flange that extends along the surface of the compartment that has the cable slot, on the exterior of the compartment, when the main door is closed. In this way, the cable-slot door can be prevented from opening if closed or closing if opened.

With the main door and the cable-slot door open, the method can include connecting an electrical cable to the docking station cabinet's cabinet-electrical-connector. In preferred embodiments, an electrical-cable connector, which is attached to the electrical cable, can be connected to the cabinet-electrical-connector. In such embodiments, the cable slot can be sized to prevent the electrical-cable connector from withdrawing from the interior of the compartment through the cable slot in the event that the electrical-cable connector is disconnected from the cabinet-electrical-connector. Connecting the electrical cable to the cabinet-electrical-connector can involve extending the electrical cable from the exterior of the compartment through a cable slot in the compartment into the interior of the compartment. This can further involve closing the main door.

In some embodiments, aspects and features discussed herein can be incorporated into cabinets other than docking station cabinets. Such cabinets can include a first door and a second door that can have attributes similar to the main door and the cable-slot door discussed elsewhere herein. Such cabinets can include a locking mechanism similar to those discussed elsewhere herein, with a first-door-locking member and a second-door-locking member having similar attributes to the main-door-locking member and the cable-slot-door-locking member discussed elsewhere herein. Such cabinets can include other aspects and features in accordance with embodiments of the present invention.

In some embodiments, the present invention can be implemented in a method in which a building's electrical system is electrically disconnected from a utility power supply and electrically connected to a portable power generator (and vice versa). In some embodiments, the method can include providing a utility trapped-key lock that includes a utility plunger. The building can be electrically disconnected from the building's electrical system (e.g., by opening the main breaker switch). A key in the utility trapped-key lock can be turned to translate the utility plunger from a utility-trapped position in which the key is trapped to a utility-untrapped position in which the key is untrapped. The utility plunger can be prevented from translating from the utility-trapped position to the utility-untrapped position when the building's electrical system is electrically connected to the utility power supply. With the utility plunger in the utility-untrapped position, the key can be removed from the utility trapped-key lock.

With the building's electrical system safely disconnected from the utility power supply, the portable power generator can be electrically connected to the building's electrical supply through a docking station. A docking station cabinet can be provided. The docking station cabinet can include some or all of the characteristics discussed elsewhere herein. The docking station cabinet can include a docking station connector on its interior. The docking station connector can be electrically connected to the building's electrical system. The docking station cabinet can include a docking station trapped-key lock that includes a docking station plunger. The docking station trapped-key lock can have some or all of the characteristics of locking mechanisms discussed elsewhere herein.

The docking station trapped-key lock can regulate access to the interior of the docking station cabinet. The key that was removed from the utility trapped-key lock can be inserted into the docking station trapped-key lock. The key can be turned to translate the docking station plunger from a docking-station-untrapped position in which the key is untrapped to a docking-station-trapped position in which the key is trapped. With the docking station plunger in the docking-station-trapped position, the interior of the docking station cabinet can be accessed. Access to the interior of the docking station cabinet can be prevented when the docking station plunger is in the docking-station-untrapped position. In preferred embodiments, accessing the interior of the docking station cabinet includes opening a first door and a second door, with the first and second doors having similar (or the same) attributes as other cabinet doors discussed herein.

With the interior of the docking station cabinet being accessible, the portable power generator can be connected to the docking station connector. In this way, the portable power generator can be electrically connected to the building's electrical system through the docking station connector. In preferred embodiments in which the docking station cabinet has first and second doors, the first door can be closed while a generator cable can be allowed to extend through a cable slot in the docking station cabinet, the cable slot being uncovered by the opened second door.

As noted, the present invention can be implemented in a method in which the building's electrical system is electrically disconnected from the portable power generator and electrically connected to the utility power supply. After the portable power generator is electrically disconnected from the portable power generator, the portable power generator can be disconnected from the docking station connector, and the docking station cabinet can be closed. With the docking station closed and its interior no longer being accessed, the key can be turned in the docking station trapped-key lock to translate the docking station plunger from the docking-station-trapped position to the docking-station-untrapped position. The docking station plunger can be prevented from translating from the docking-station-trapped position to the docking-station-untrapped position when the interior of the docking station cabinet is accessed. In preferred embodiments in which the docking station cabinet has first and second doors, the docking station plunger can be prevented from translating to the docking-station-untrapped position when either the first door is open or the second door is open. With the docking station plunger in the docking-station-untrapped position, the key can be removed from the docking station trapped-key lock.

After the docking station cabinet has been safely isolated and closed, the key can be inserted into the utility trapped-key lock. The key can be turned in the utility trapped-key lock to translate the utility plunger from the utility-untrapped position to the utility-trapped position. With the utility plunger in the utility-trapped position, the building's electrical system can be electrically connected to the utility power supply. Electrically connecting the building's electrical system to the utility power supply can be prevented when the utility plunger is in the utility-untrapped position.

In the foregoing detailed description, the invention has been described with reference to specific embodiments. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:
1. A cabinet, comprising:
   a compartment that includes an interior, an exterior, and a first surface having a cable slot,
   a cabinet-electrical-connector housed in the interior of the compartment,
   a main door coupled to the compartment, the main door being movable between a main-door-closed position and a main-door-open position, wherein the cabinet-electrical-connector is accessible when the main door is in the main-door-open position;
   a cable-slot door coupled to the compartment, the cable-slot door being movable between a cable-slot-door-closed position and a cable-slot-door-open position; and
   a compartment locking mechanism that comprises:
      (i) a locking-mechanism housing coupled to the interior of the compartment, the locking-mechanism housing defining a bore,
      (ii) a trapped-key lock coupled to the compartment, the trapped-key lock including a key and a plunger, with the key being turnable to translate the plunger within the bore between a trapped position and an untrapped position, and with the key being trapped when the plunger is in the trapped position,
      (iii) a main-door-locking member coupled to the locking-mechanism housing, wherein the main-door-locking member is movable between a main-door-locked position and a main-door-unlocked position;
      (iv) a cable-slot-door-locking member coupled to the locking-mechanism housing, wherein the cable-slot- door-locking member is movable between a cable-slot-door-locked position and a cable-slot-door unlocked position; and wherein the plunger is prevented from translating to the untrapped position when either the main-door-locking member is in the main-door-unlocked position or the cable-slot-door-locking member is in the cable-slot-door-unlocked position.

2. The cabinet of claim 1 wherein the main door is hingedly connected to the compartment and rotatable about a generally vertical main-door axis and covers a front of the compartment when in the main-door-closed position.

3. The cabinet of claim 1 wherein the cable-slot door is hingedly connected to the compartment and rotatable about a generally horizontal cable-slot-door axis.

4. The cabinet of claim 1 wherein an electrical cable is extendible from the exterior of the compartment through the compartment's cable slot into the interior of the compartment when the cable-slot door is in the cable-slot-door-open position.

5. The cabinet of claim 4 wherein the cable-slot door covers the compartment's cable slot, thereby preventing the electrical cable from extending from the exterior of the compartment through the compartment's cable slot into the interior of the compartment, when the cable-slot door is in the cable-slot-door-closed position.

6. The cabinet of claim 1 wherein the main-door-locking member is movable between (A) a main-door-locked position in which the main-door-locking member is prevented from moving into the bore by the plunger in the untrapped position and the main door is prevented from opening and (B) a main-door-unlocked position in which the main-door-locking member is moved into the bore unimpeded by the plunger in the trapped position and the main door is permitted to open.

7. The cabinet of claim 1 wherein the cable-slot-door-locking member is movable between (A) a cable-slot-door-locked position in which the cable-slot-door-locking member is prevented from moving into the bore by the plunger in the untrapped position and the cable-slot door is prevented from opening and (B) a cable-slot-door-unlocked position in which the cable-slot-door-locking member is moved into the bore unimpeded by the plunger in the trapped position and the cable-slot door is permitted to open.

8. The cabinet of claim 1 wherein the compartment includes top, bottom and opposed side surfaces and wherein the bottom surface has the cable slot.

9. The cabinet of claim 1 wherein the main door includes a flange that extends along the first surface of the compartment on the exterior of the compartment when the main door is in the main-door-closed position, wherein the main door's flange prevents the cable-slot door from rotating from the cable-slot-door-closed position to the cable-slot-door-open position, or from the cable-slot-door-open position to the cable-slot-door-closed position, when the main door is in the main-door-closed position.

10. The cabinet of claim 1 wherein the main door includes a main-door latch and wherein in the main-door-unlocked position, the main-door-locking member is moved into the bore unimpeded by the plunger in the trapped position as a result of the main-door latch being unlatched.

11. The cabinet of claim 1 wherein the cable-slot door includes a cable-slot-door latch and wherein in the cable-slot-door-unlocked position, the cable-slot-door-locking member is moved into the bore unimpeded by the plunger in the trapped position as a result of a rotational biasing force that is unopposed by the cable-slot-door latch when unlatched.

12. A cabinet, comprising:
a compartment that includes an interior and an exterior;
a first door coupled to the compartment, the first door being movable between a first-door-closed position and a first-door-open position;
a second door coupled to the compartment, the second door being movable between a second-door-closed position and a second-door-open position; and
a trapped-key lock coupled to the compartment, the trapped-key lock including a key and a plunger, with the key being turnable to translate the plunger between a trapped position and an untrapped position, and with the key being trapped when the plunger is in the trapped position; and
a first-door-locking member, wherein the first-door-locking member is movable between a first-door-locked position and a first-door-unlocked position;
a second-door-locking member, wherein the second-door-locking member is movable between a second door-locked position and a second-door-unlocked position; and
wherein the plunger is prevented from translating to the untrapped position when either the first-door-locking member is in the first-door-unlocked position or the second-door-locking member is in the second-door-unlocked position.

13. The cabinet of claim 12 further comprising a locking-mechanism housing coupled to the interior of the compartment, the locking-mechanism housing defining a bore, wherein the key is turnable to translate the plunger within the bore between a trapped position and an untrapped position.

14. The cabinet of claim 12 wherein the first-door-locking-member is coupled to the locking-mechanism housing and movable between (A) a first-door-locked position in which the first-door-locking member is prevented from moving into the bore by the plunger in the untrapped position and the first door is prevented from opening and (B) a first-door-unlocked position in which the first-door-locking member is moved into the bore unimpeded by the plunger in the trapped position and the first door is permitted to open.

15. The cabinet of claim 12 wherein the second-door-locking-member is coupled to the locking-mechanism housing and movable between (A) a second-door-locked position in which the second-door-locking member is prevented from moving into the bore by the plunger in the untrapped position and the second door is prevented from opening and (B) a second-door-unlocked position in which the second-door-locking member is moved into the bore unimpeded by the plunger in the trapped position and the second door is permitted to open.

16. The cabinet of claim 12 wherein the compartment includes top, bottom, and opposed side surfaces, the first door is rotatable about a generally vertical first-door axis and covers a front of the compartment when in the first-door-closed position, and the second door is rotatable about a generally horizontal second-door axis and covers a bottom of the compartment when in the second-door-closed position.

17. The cabinet of claim 12 wherein the first door includes a flange that prevents the second door from rotating from the second-door-closed position to the second-door-open position, or from the second-door-open position to the second-door-closed position, when the first door is in the first-door-closed position.

18. The cabinet of claim 12 wherein the first door includes a first-door latch, and in the first-door-unlocked position, the first-door-locking member is moved into the bore unimpeded by the plunger in the trapped position as a result of the first-door latch being unlatched.

19. The cabinet of claim 12 wherein the second door includes a second-door-latch, and in the second-door-unlocked position, the second-door-locking member is moved into the bore unimpeded by the plunger in the trapped position as a result of a rotational biasing force that is unopposed by the second-door latch when unlatched.

20. A cabinet comprising:
   a compartment that includes an interior and an exterior;
   a first door coupled to the compartment, the first door being movable between a first-door-closed position and a first-door-open position; and
   a second door coupled to the compartment, the second door being movable between a second-door-closed position and a second-door-open position; and
   a trapped-key lock coupled to the compartment, the trapped-key lock including a key and a plunger, with the key being turnable to translate the plunger between a trapped position and an untrapped position, and with the key being trapped when the plunger is in the trapped position; and
   means for preventing (i) the first door from moving from the first-door-closed position when the plunger is in the untrapped position, (ii) the second door from moving from the second-door-closed position when the plunger is in the untrapped position, and (iii) the plunger from moving to the untrapped position when either the first door is in the first-door-open position or the second door is in the second-door-open position.

* * * * *